US011858139B1

(12) United States Patent
Erdogan et al.

(10) Patent No.: US 11,858,139 B1
(45) Date of Patent: Jan. 2, 2024

(54) ROBOTIC MANIPULATOR SYSTEMS AND METHODS INVOLVING NON-PLANAR AND/OR DEFORMABLE SUPPORT STRUCTURES

(71) Applicant: Amazon Technologies, Inc., Seattle, WA (US)

(72) Inventors: Can Erdogan, Berlin (DE); Kiru Park, Berlin (DE); Johannes Kulick, Berlin (DE); Zoltan Beck, Berlin (DE); Michael Nalin Mistry, Edinburgh (GB); Lesley Yu, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 17/459,587

(22) Filed: Aug. 27, 2021

(51) Int. Cl.
| | |
|---|---|
| *B25J 9/16* | (2006.01) |
| *B25J 13/08* | (2006.01) |
| *B25J 9/00* | (2006.01) |
| *G06T 7/70* | (2017.01) |
| *G06T 7/50* | (2017.01) |
| *G06V 20/00* | (2022.01) |
| *G06V 20/64* | (2022.01) |

(52) U.S. Cl.
CPC ........... *B25J 9/1612* (2013.01); *B25J 9/0096* (2013.01); *B25J 9/1633* (2013.01); *B25J 9/1664* (2013.01); *B25J 9/1697* (2013.01); *B25J 13/08* (2013.01); *G06T 7/50* (2017.01); *G06T 7/70* (2017.01); *G06V 20/00* (2022.01); *G06V 20/653* (2022.01); *G06T 2207/10028* (2013.01)

(58) Field of Classification Search
CPC ...... B25J 9/1612; B25J 9/0096; B25J 9/1633; B25J 9/1664; B25J 9/1697; B25J 13/08; G06T 7/50; G06T 7/70; G06T 2207/10028; G06V 20/00; G06V 20/653
See application file for complete search history.

(56) References Cited

U.S. PATENT DOCUMENTS

| | | | |
|---|---|---|---|
| 9,981,382 B1* | 5/2018 | Strauss | B25J 9/1697 |
| 2012/0015151 A1* | 1/2012 | Pearce | B32B 27/08 |
| | | | 264/293 |
| 2020/0316782 A1* | 10/2020 | Chavez | G06T 7/12 |

* cited by examiner

*Primary Examiner* — Adam R Mott
*Assistant Examiner* — Matthew C Gammon
(74) *Attorney, Agent, or Firm* — Eversheds Sutherland (US) LLP

(57) ABSTRACT

Systems, methods, and systems are disclosed for a robotic manipulator system including a robotic manipulator, a controller, one or more sensors, and a support structure. The support structure may be non-planar and/or deformable and may be designed to support an object on an upper surface. The one or more sensors may be directed towards the support structure and object. The controller and/or another computing device in communication with the controller may determine geometry of the support structure and may know or determine a compression value of the support structure. Using the compression value and/or geometry of the support structure, the controller may cause the robotic manipulator to grasp the object from the support structure and move the object to a new location.

20 Claims, 10 Drawing Sheets

ROBOTIC MANIPULATOR SYSTEMS AND METHODS INVOLVING NON-PLANAR AND/OR DEFORMABLE SUPPORT STRUCTURES

BACKGROUND

Robotic manipulator devices have been developed to move items from one location to another and/or to change an orientation of an object. Typically, an object may be place on a surface with the reach of the robotic manipulator. The robotic manipulator may determine a location of the object and grip the object (e.g., using one or more finger extensions). The objects may have several faces that may be griped by the robotic manipulator. For example, a robotic manipulator may pick up an object by griping a top portion of the object. However, it may be difficult for the robotic manipulator to extend to the top portion of an object as it may have limited reach. Alternatively, a robotic manipulator may attempt to grip a bottom portion of the object, however, it may be difficult to do so as the surface supporting the object may be rigid and contact between the robotic manipulator and the surface may damage the robotic manipulator and/or the surface.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
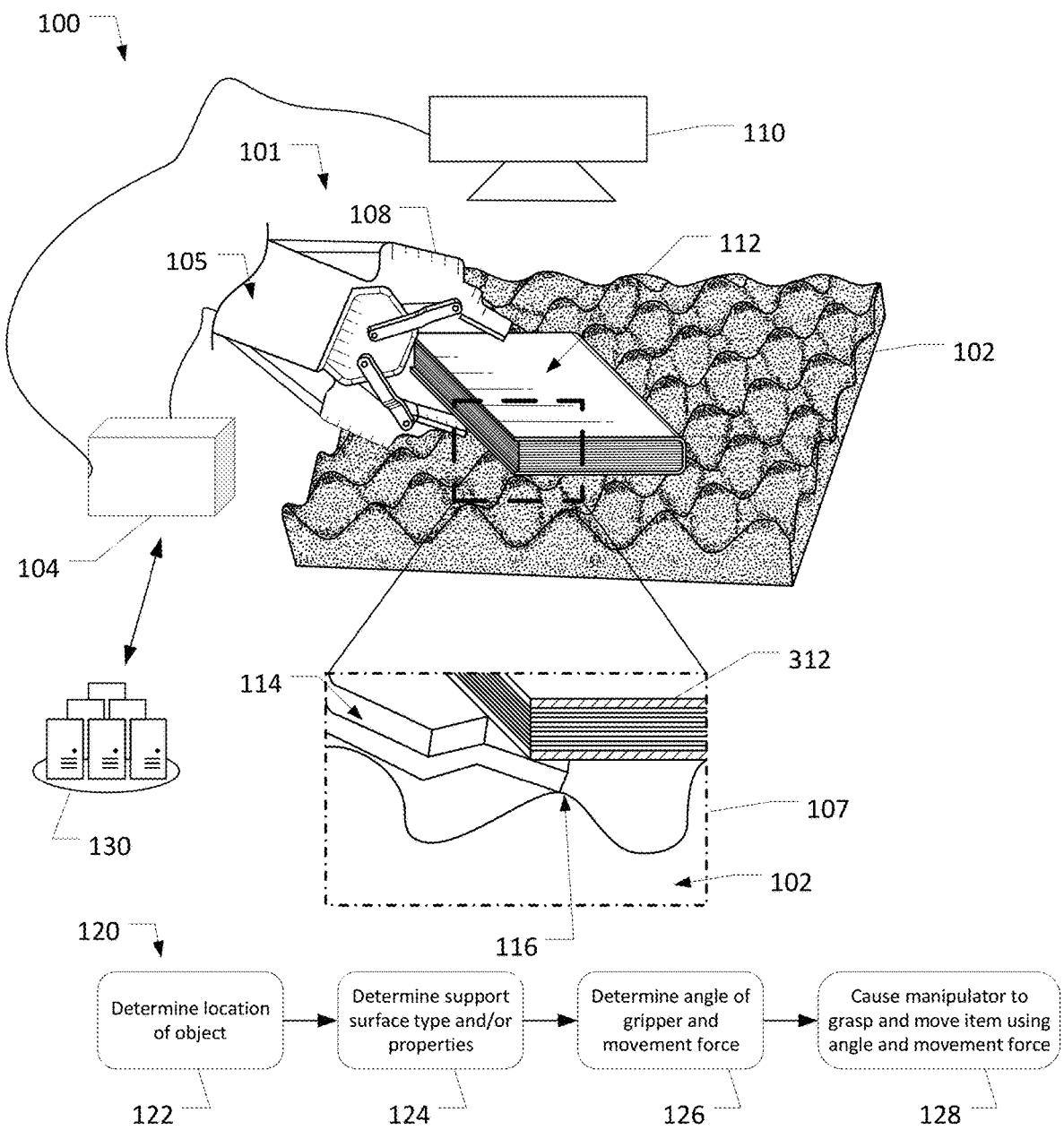
FIG. 1 is a schematic illustration of an exemplary robotic manipulator system, in accordance with one or more example embodiments of the present disclosure.

The systems and methods herein involve a manipulator system including a robotic manipulator, a controller, a support structure, and one or more sensors. The support structure may be any type of deformable or non-rigid support surface designed to support an object on an upper surface of the support structure. In one example, the support structure may be both deformable and non-even, such that portions of the support structure are positioned higher than other portions of the support structure. For example, a support structure may have an "egg-crate" type geometry with peaks and valleys. The support structure may be made from any well-known deformable or non-rigid material (e.g., foam, beads, liquid).

The support structure may be positioned in close proximity to a robotic manipulator. The robotic manipulator may include one or more linked arms that may have multiple degrees of freedom and may include a gripper at a distal end for gripping objects. The arms may be articulating arms. The gripper may include two or more finger extensions, for example, for griping objects (e.g., clamping objects between the two finger extensions). However, any type of well-known gripper may be used. The robotic manipulator may have a reach that extends to the support structure. The robotic manipulator may include or may be in communication with a controller.

The controller may also be in communication with one or more sensors. For example, a sensor may be any visual or light sensor (e.g., any type of camera) a stereo sensor, a color (RGB) sensor, a Lidar sensor, and/or any other type of sensor for sensing light, depth, and/or colors. The sensor may generate sensor data regarding the support structure and/or the object and may communicate the sensor data to the controller. The controller may analyze the sensor data and/or any other information known about the support surface and/or object and may determine an optimal approach for griping and moving the object to a new location.

The controller may analyze sensor data regarding the support structure and/or may be programmed to know information about the support structure (e.g., compression information), and may use this information to determine one or more movements of the robotic manipulator, including an angle of the manipulator and/or gripper and a force to be used for such movements. The controller may further determine contact locations on the object that the robotic manipulator should contact the object.

The manipulator system described herein may provide an optimal setting for griping a surface of an object. Specifically, the non-planar nature of the support structure may provide voids under a surface of an object into which the gripper may extend into to grip the bottom surface of the object. Further, the deformable nature of the support structure may permit the gripper to position itself below the bottom surface of the object. As the controller may know or determine the type of material and/or geometry of the support structure, the controller may predict how the support surface will interact with the robotic manipulator. In this manner, the robotic manipulator system may grip and move objects that traditional robotic manipulator systems would not be able to grip and/or move.

Referring now to FIG. 1, an exemplary use case of robotic manipulator system 100 is illustrated in accordance with one or more example embodiments of the disclosure. As is shown in FIG. 1, robotic manipulator system 100 may include support structure 102, robotic manipulator 101, controller 104 and sensor 110. The controller 104 may optionally communicate with computing device 130 which may be a remote computing device. Also shown in FIG. 1, support structure 102 may support object 112. In this example, object 112 may be a book, though it is understood that support structure 102 may support any type of object and/or multiple objects.

Support structure 102 may be any type of deformable or non-rigid support surface designed to support an object on an upper surface of the support structure 102. Support structure 102 may be deformable and/or non-even, such that portions of the support structure may be positioned higher than other portions of the support structure. As shown in FIG. 1, support structure 102 may have an "egg-crate" type geometry with peaks and valleys. The support structure may be made from any well-known deformable or non-rigid material (e.g., foam, beads, liquid). The support structure may return to its original shape after being deformed.

Robotic manipulator 101 may include one or more arms (e.g., arm 105) and may include a gripper 108 at the distal end. The arms (e.g., arm 105) may be articulating arms. The gripper 108 may be designed to open and close to grip an object such that the robotic manipulator 101 may grip an object, move an object, and release the object at a new location. As shown in close-up view 107, gripper may include one or more finger extensions 114 that may make contact with the object. However, any type of well-known gripping or grasper may be used. The robotic manipulator 101 may have a reach that extends to the support structure.

The robotic manipulator 101 may include or may be in communication with controller 104 which may be separate from or incorporated into robotic manipulator 101 and/or may be in wired communication or wireless communication with robotic manipulator 105. The controller 104 may further communicate with sensor 110 and optionally computing device 130 via any wired or wireless communication technology. Controller 104 may be any computing device with a processor. For example, controller 104 may be a laptop, desktop computer, server, or even a smart phone, tablet, or the like. Controller 104 may run one or more local applications to facilitate operation of the robotic manipulator and/or sensor, and/or may perform such operations together with one or more other computing devices or servers that may otherwise process instructions and/or perform operations or tasks described herein.

Sensor 110 may be any visual or light sensor (e.g., any type of camera) a stereo sensor, a color (RGB) sensor, a greyscale sensor, a Lidar sensor, proximity sensor and/or any other type of sensor for sensing light, depth, proximity and/or colors. The sensor 110 may generate sensor data regarding the support structure and/or the object and may communicate the sensor data (e.g., RGB and/or stereo data) to the controller 104. It is understood that more than one sensor may be included in robotic manipulator system 100.

As shown in close-up view 107, finger extension 114 of gripper 108 may be positioned under object 112. As support structure 102 is deformable, robotic manipulator 101 and specifically finger extension 114 may make contact with support structure 102 and specifically support portion 116. Support portion 116 may be a domed shaped component of support structure 102 and may compress and/or partially flatten as gripper 108 and finger extension 114 advance toward object 112. The deformation of support portion 116 may permit gripper 108 to be positioned under object 112. Further the voids present in support structure 102 permit gripper 108 and finger extension 114 to be positioned below object 112 with minimal contact with object 112.

To initiate the actions of employing the robotic manipulation system shown in FIG. 1, an example process flow 120 is presented and may be performed, for example, by one or more modules at controller 104. For example, the controller may include at least one memory that stores computer-executable instructions and at least one processor configured to access the at least one memory and execute the computer-executable instructions to perform various actions or operations, such as one or more of the operations in the process flow 120 of FIG. 1.

At block 122, a location of the object 112 with respect to the support structure 102 and/or the robotic manipulator 101 may be determined. For example, image and/or light data generated by sensor 101 may be processed to make this determination. At block 124, a surface type and/or properties corresponding to the support structure may be determined. For example, controller 104 may know about the surface geometry and/or compression properties of support structure. Alternatively, image and/or light data corresponding to the structure may be analyzed to determine the support structure matches a support structure known to controller 104 with known properties and/or surface geometries. In one example, controller may even maintain or have access to a three-dimensional model of the support structure 102.

At block 126, an angle of the gripper 108 and/or advancement or movement force for the gripper 108 be determined. This determination may be based on the location of the object and information known about the support surface 102 (e.g., compression properties and/or geometric of the surface). The angle may be the angle of the gripper 108 with respect to a plane of support surface 102. The force may be the force applied to arm 105 to move it in any direction. At block 128, the robotic manipulator may cause the robotic manipulator to retrieve the item using the angle and the force determined at block 126.

Illustrative Process and Use Cases

Referring now to FIGS. 2A-2D various cross-sections of exemplary support structures are depicted in accordance with one or more example embodiments of the disclosure. It is understood that support structures in the present robotic manipulation system may take any shape and may even be planar. Further, it is understood that the support structure may be uniform with repeating patterns or may be non-uniform with varying patterns. It is understood that the height of the peaks and the depth of the valleys may be varied.

Figure 2A:
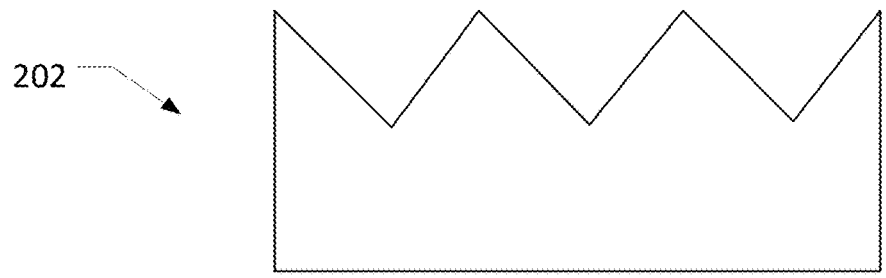
FIGS. 2A-2D are schematic illustrations of exemplary support structure geometries, in accordance with one or more example embodiments of the present disclosure.

As shown in FIG. 2A, support structure 202 may include a plurality of triangular shaped peaks that form cones or pyramids in three-dimensional space. The triangular shaped peaks may offer the smallest contact points with the objects and may offer large voids in the area closest to the objects, as compared to other geometries.

Figure 2B:
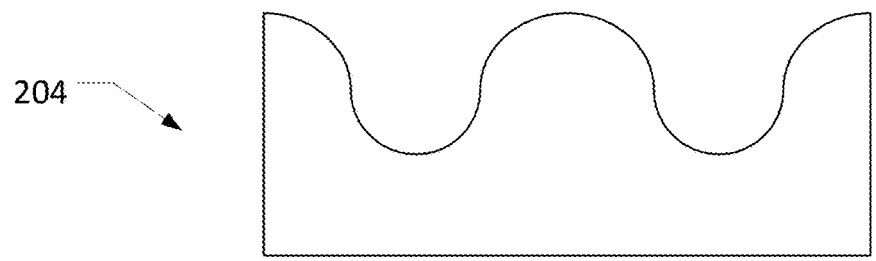

As shown in FIG. 2B, support structure 204 may include a plurality of circular peaks that form domes in three-dimensional space. For example, support structure 204 may appear similar to support structure 102 illustrated in FIG. 1. The domed shaped peaks may offer relatively small contact points with the object and may maximize the void closest to the object.

Figure 2C:
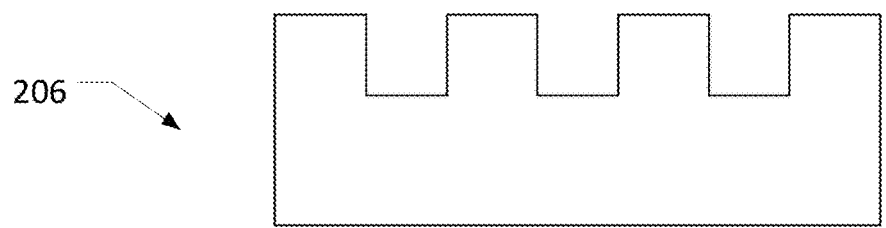

As shown in FIG. 2C, support structure 206 may include a plurality of square or rectangular peaks that form cubes in three-dimensional space. For example, each cube peak may be adjacent on all sides to an equally sized cubic void. The cubed shaped peaks may offer a significant amount of support for object and may be used for heavy objects, for example.

Figure 2D:
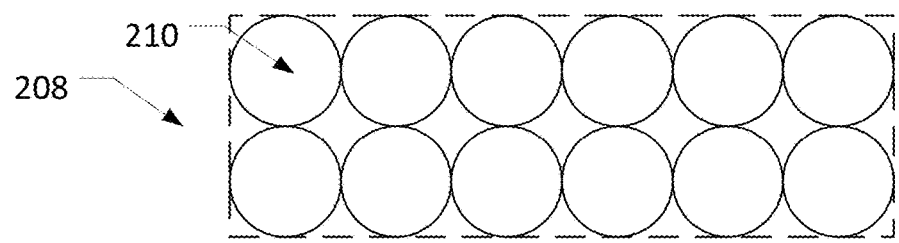

As shown in FIG. 2D, support structure 208 may even be generally flat, without any peaks and without any valleys. In one example, a container may be filled with beads 210 or any other structure that may be moved or displaced. For example, beads 210 may be rigid but may be displaced to permit finger extensions of a gripper of a robotic manipulator to become submerged below the surface of the beads.

Figure 3A:
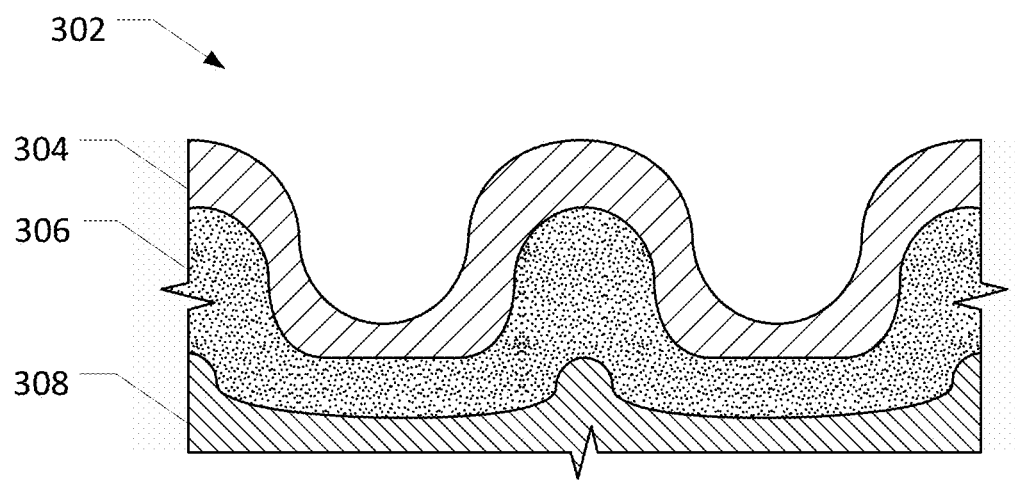
FIGS. 3A-3B are schematic illustrations of exemplary support structures and their internal composition, in accordance with one or more example embodiments of the present disclosure.
Figure 3B:
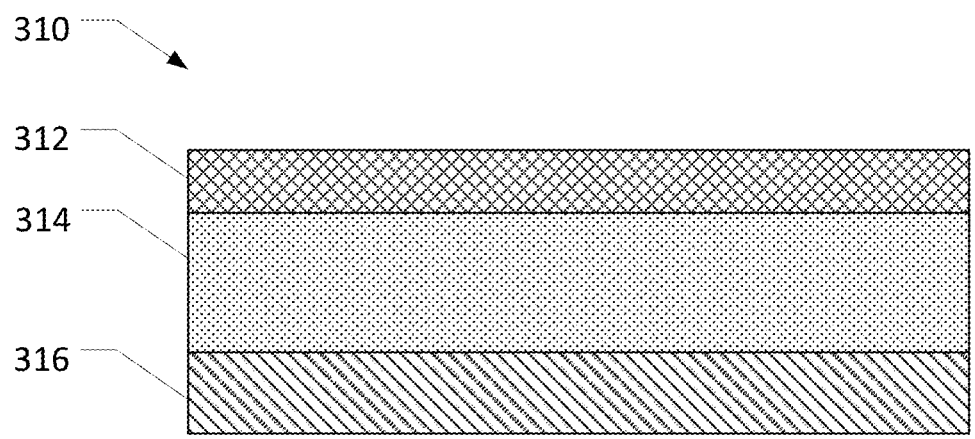

Referring now to FIGS. 3A-3B, multi-layered support structures with varying compression properties are depicted, in accordance with one or more example embodiments of the disclosure. As shown in FIG. 3A, support structure 302 includes domed peaks and domed troughs interspaced between the domed peaks. The shape and size of the peaks and troughs may be uniform throughout or may vary. As shown in FIG. 3A, support structure 302 may be formed from several layers of materials. In one example, support structure 302 may include three layers of compressible foam. Each layer of compressible foam may have a different compression value (e.g., a value indicative of a degree or amount of compression for a given force). For example, layer 104 may be the most compressible, layer 308 may be the least compressible (e.g., most firm), and layer 306 may have a compression value between layer 304 and layer 308. It is understood that there may be greater or fewer layers than those shown in FIG. 3A, and each layer may have a different shape, size, and/or compression value.

Referring now to FIG. 3B, support structure 310 which may be an even and/or planar surface that may be formed from several layers of materials. In one example, support structure 310 may include three layers of compressible foam. Each layer of compressible foam may also be even and/or planar and may have a different compression value than the other layers. For example, layer 312 may be the most compressible, layer 316 may be the least compressible (e.g., most firm), and layer 314 may have a compression value between layer 312 and layer 316. It is understood that there may be greater or fewer layers than those shown in FIG. 3A, and each layer may have a different shape, size, and/or compression value than each other layer.

Figure 4A:
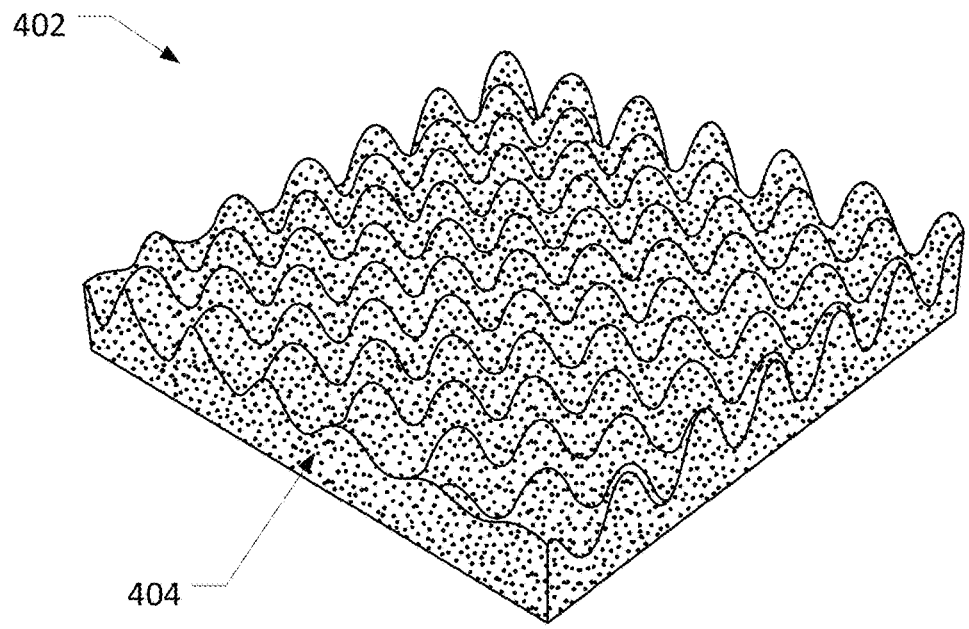
FIGS. 4A-4B are schematic illustrations of an exemplary support structure and a representation thereof, in accordance with one or more example embodiments of the present disclosure.
Figure 4B:
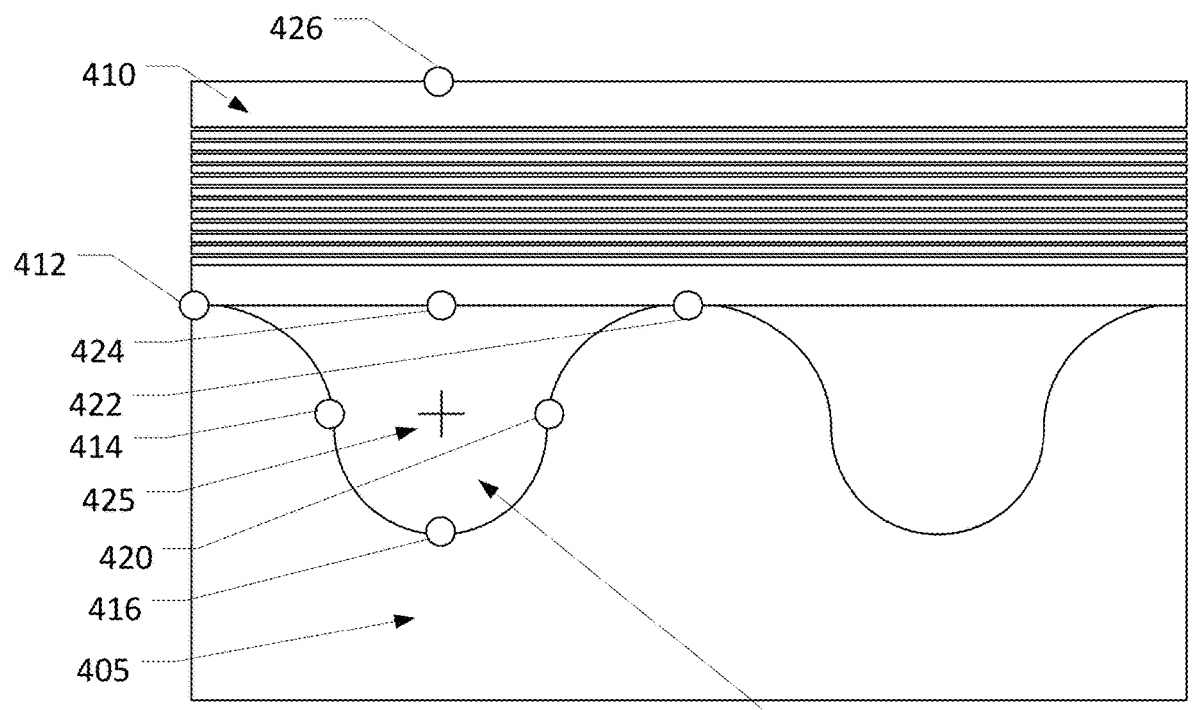

Referring now to FIGS. 4A-4B, schematic illustrations of an exemplary support structure and representation thereof are depicted in accordance with one or more example embodiments of the disclosure. Referring now to FIG. 4A, an exemplary point cloud representation 402 of a support structure is illustrated. As explained above with respect to FIG. 1, a robotic manipulator system may include one or more sensors focused on and/or oriented towards the support structure. The sensor or sensors may be any visual or light sensor (e.g., any type of camera) a stereo sensor, a color (RGB) sensor, a greyscale sensor, a Lidar sensor, and/or any other type of sensor for sensing light, depth, and/or colors. The sensor may generate sensor data regarding the support surface and/or an object positioned on the support structure and may communicate the sensor data to the controller.

The sensor data generated by the one or more sensors may be processed by a point cloud module (e.g., on the controller and/or a computing device in communication with the controller) to determine a three-dimensional point cloud corresponding to the sensor data. For example, the sensor data may be RGB data, stereo data, greyscale data and/or depth data. The point cloud module may process the three-dimensional point cloud (e.g., using segmentation algorithms) to determine perspective views of the depth point cloud (e.g., top down views) and may further segment the point cloud resulting in depth segmentation.

In this manner, the controller and/or any other computing device in communication with the controller may process the sensor data to determine a three-dimensional point cloud and may process the point cloud using a depth segmentation module to segment the depth point cloud. The controller and/or computing device may process the sensor data using one or more algorithms and/or models that are designed and/or trained to determine a three-dimensional representation of the sensor data such as a point cloud. For example, the three-dimensional representation of the support structure may be point cloud representation 402.

As shown in FIG. 4A, the point cloud representation 402 may be made up of points 404 arranged in three-dimensional space to form the representation. The point cloud representation may be used to determine geometry, size and/or shape information regarding the support structure. Further, the point cloud representation may be used to match the support structure to known support structures. For example, the controller and/or computing device may maintain a library of known support structures that may be associated with certain geometries and/or other properties. The controller and/or library may also maintain a library of three-dimensional models of known support structures.

Referring now to FIG. 4B, the controller and/or computing device in communication with the controller may analyze the sensor data and/or point cloud data to determine the geometry of the support structure and any voids defined by the support structure and/or object. For example, support structure 405 may include a domed peaks and valleys that may be uniformly distributed. A side view of the support structure and/or point cloud representation of the support structure may be analyzed to determine the size and shape of the peaks and valleys and may further be analyzed to determine one or more voids defined by an object positioned on the support structure (e.g., object 410) and the support structure 405.

For example, controller and/or computing device in communication with the controller may determine points along the surface to define the void. In one example, peaks 412 and 422, center points 414 and 420 and bottom point 416 of the support structure peaks and valleys may be determined based on the sensor data and/or point cloud data. Further, a lower boundary point 424 of object 410 may be identified to fully define void 408. An upper boundary point 426 of object 410 may also be identified to determine an upper boundary of the object 410. The points defining the void may be used to determine a center point 425 of the void 408. If the support structure is uniform, the geometry, including the center point, of other voids may be estimated. It is understood that any other well-known technique or approach may be used to determine and/or define the void of the support structure. In one example, the robotic manipulator system may align the robotic manipulator with the center point 425.

Figure 5:
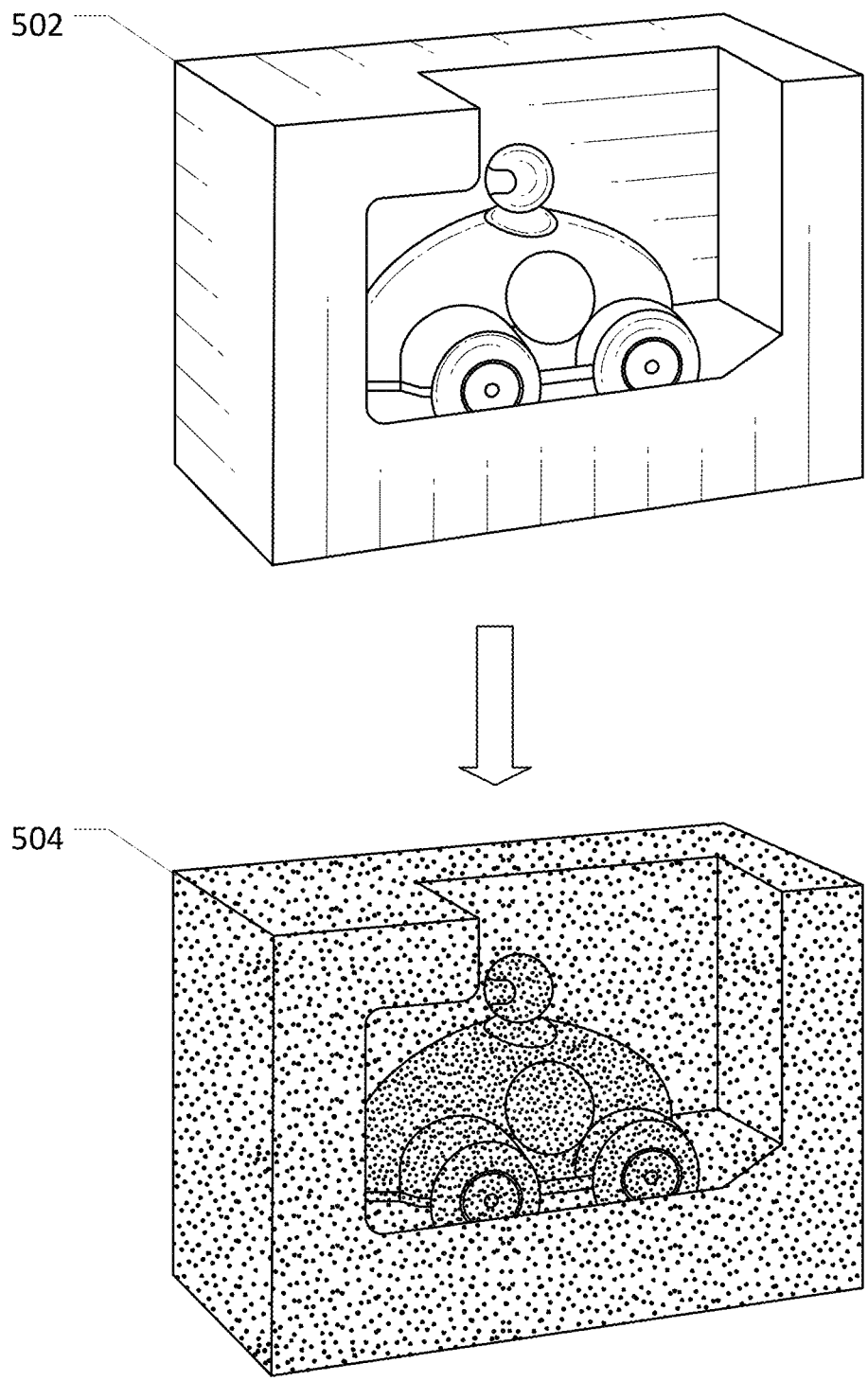
FIG. 5 is a schematic illustration of an exemplary object and representation thereof, in accordance with one or more example embodiments of the present disclosure.

Referring now to FIGS. 5, a schematic illustration of an exemplary object and representation of the object is illustrated in accordance with one or more example embodiments of the disclosure. Object 502 may be positioned on a support structure (e.g., support structure 102 of FIG. 1) and sensor data may be generated with respect to object 502, as described above with respect to FIG. 4A. As explained above, the sensor data may be processed (e.g. by a point cloud module running on the controller and/or computing device in communication with the controller) to generate point cloud 504.

Point cloud representation 504 may be generated at the same time as the point cloud generated for the support structure or may be generated at a different time. Further, the sensor data used to generate the point cloud representation of the support structure may be the same or different than the sensor data used to generate point cloud representation 504 of object 502. Similar to the point cloud representation of the support structure, point cloud representation 504 of object 502 may be used to determine geometry, size and/or shape information regarding the object.

Figure 6:
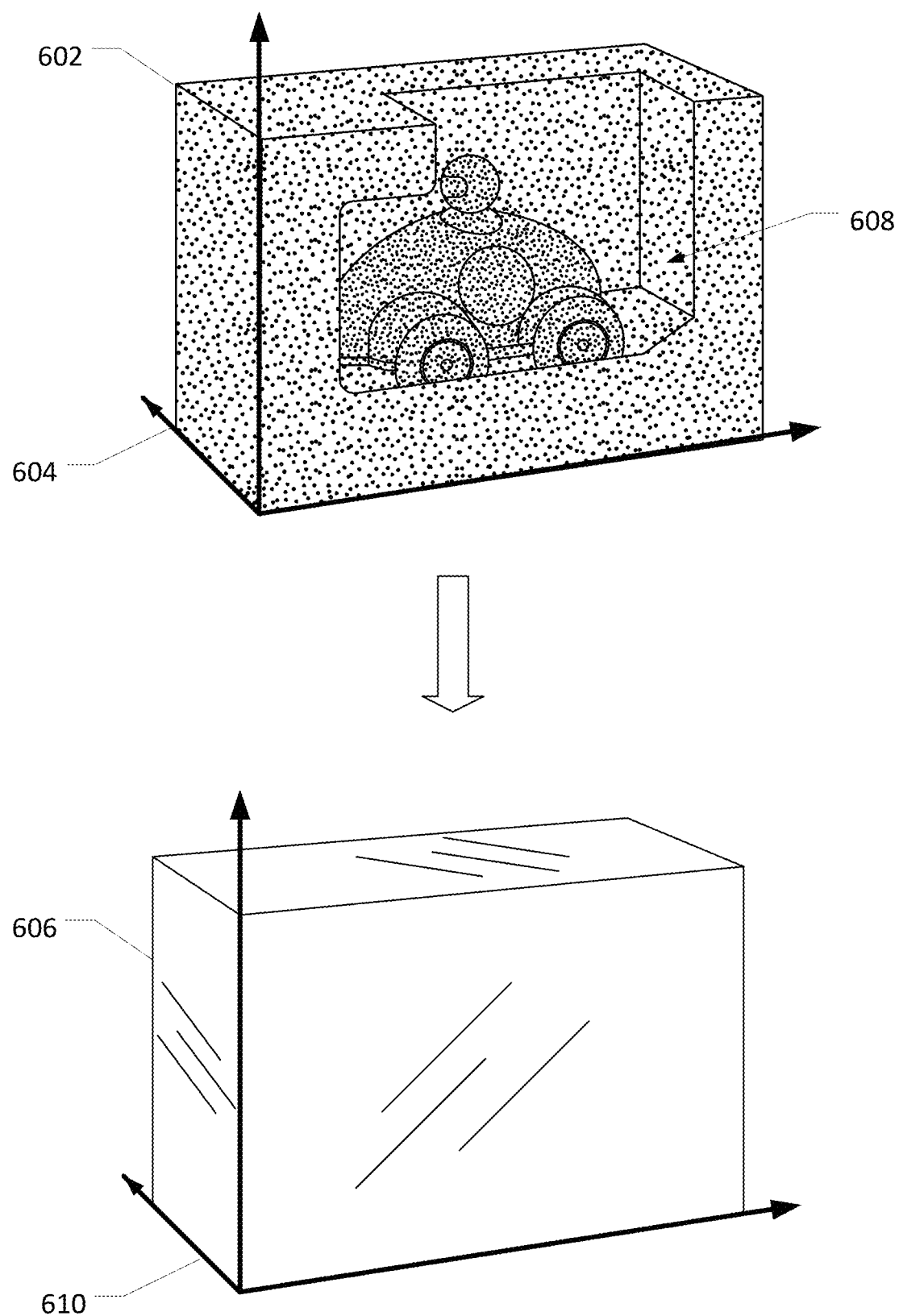
FIG. 6 is a schematic illustration of a box representation of an object, in accordance with one or more example embodiments of the present disclosure.

Referring now to FIG. 6, a technique for generating box representation of an object is depicted, in accordance with one or more example embodiments of the present disclosure. The point cloud representation of the object may be used to estimate the size and shape of the object which may be useful for determining where and how to grasp the object using the robotic manipulator. In one example, it may be useful to simplify the shape of the object. For example, the point cloud representation may be used to determine a bounding box of the object.

In one example, the minimal volume bounding box (MVBB) technique may be employed. In the bounding box approach, a point cloud representation 602 of the object, which may be the same a cloud representation 504 of FIG. 5, may be processed to determine one or more boxes with minimal volume that are used to estimate the surface, shape and size of the object and/or point cloud representation of the object.

As shown in FIG. 6, box representation 606 may be a box representation of the point cloud representation 602 of the object. The box representation 606 may simplify the shape of the point cloud representation 602 of the object. For example, the point cloud representation 602 may reflect an indentation 608 of the object. However, the box representation may simplify this shape with a standard rectangle. A reference frame of the object and point cloud representation of the object based on the shape and/or geometry of the object (e.g., reference frame 604), may correspond to reference frame 610 the box representation 606.

Figure 7:
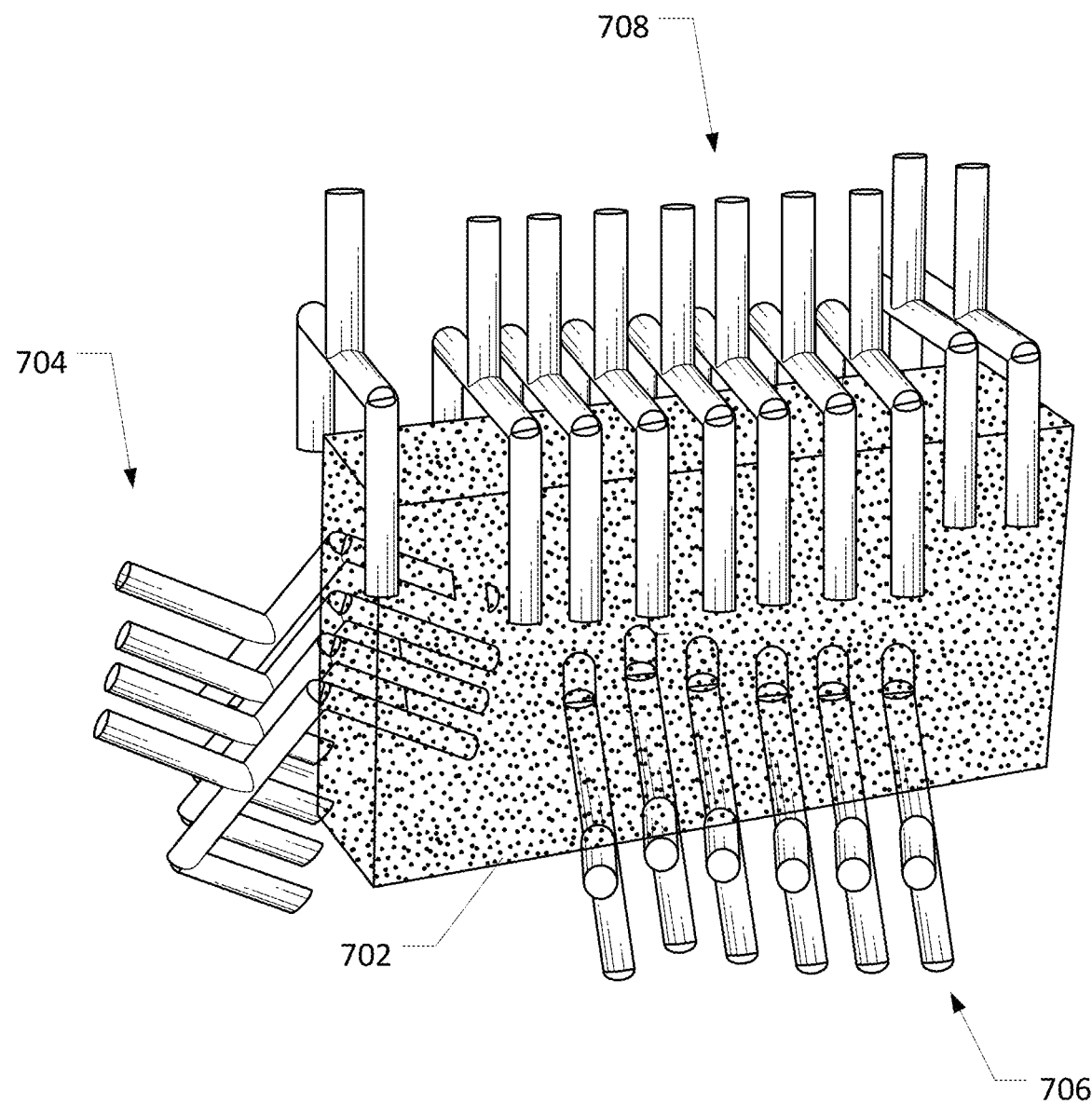
FIG. 7 is a schematic illustration of contact points on the object for grasping the object, in accordance with one or more example embodiments of the disclosure.

Referring now to FIG. 7, an approach for determining a plurality of contact points on the object and/or a representation of the object is illustrated, in accordance with one or more example embodiments of the present disclosure. As shown in FIG. 7, a bounding box 702 may be determined from an object and/or point cloud representation. To determine the best contact points for grasping the object, the controller and/or a computing device in communication with the controller may position a representation of the gripping device, using known dimensions, to determine the optimal location on the object to grasp the object.

In one example, gripping representations 704, gripping representations 708, and gripping representations 706 may be considered to determine possible gripping locations on a left side of the object, top side of the object, and front side of the object. The gripping location that fits within the gripping constraints and/or minimizes contact with a support structure may be determined to be the optimal gripping position. It is understood that the geometry of the support structure may be known and such information may inform the optimal gripping positions.

Figure 8A:
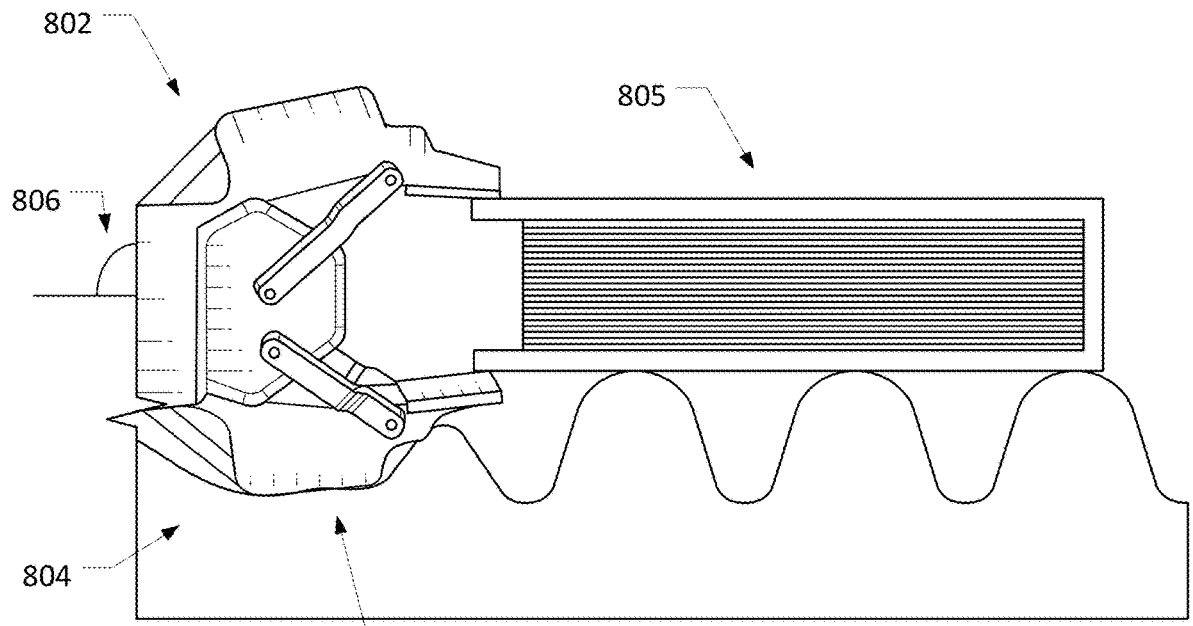
FIGS. 8A-8B are schematic illustrations of interactions between the robotic manipulator and the support structure, in accordance with one or more example embodiments of the present disclosure.
Figure 8B:
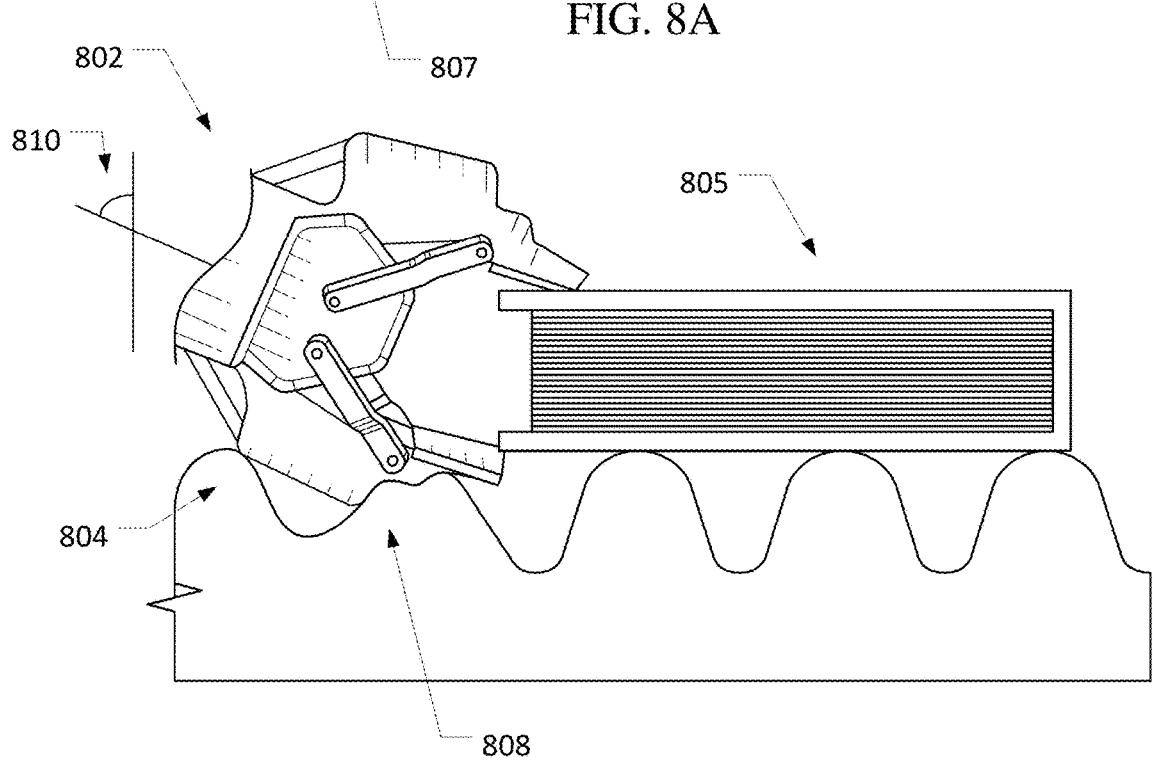

FIGS. 8A-8B illustrate an exemplary robotic manipulator interfacing with a support structure at various angles, in accordance with one or more example embodiments of the present disclosure. As shown in FIG. 8A, when the robotic manipulator 802 approaches object 805 with an angle 806 that is normal to a plane of the support structure 804, a gripper at the distal end of the robotic manipulator 802 may interfere significantly with the peaks of the support structure. The degree of compression resulting from the interference may cause the object 805 to move away from robotic manipulator 802 and/or may result in resistive forces from the support structure acting on the robotic manipulator that are relatively large and may be difficult to predict. Further such force may damage the support structure.

Referring now to FIG. 8B, robotic manipulator 802 may approach support structure 804 at angle 810 that is less than 90 degrees from the plane that is normal to the longitudinal plane of the support structure. Such an angle of the robotic manipulator 802 may permit the gripper of the robotic manipulator 802 to enter a void of the support structure and otherwise avoid significant interface with the support structure 804. As shown in FIG. 8B, the interference and resulting compression 808 of the support structure 804 when the robotic manipulator 802 is oriented at such an angle is significantly less than the compression 807 in FIG. 8A, when the robotic manipulator 802 approaches at angle 806 that is normal to a plane of the support structure 804.

Figure 9:
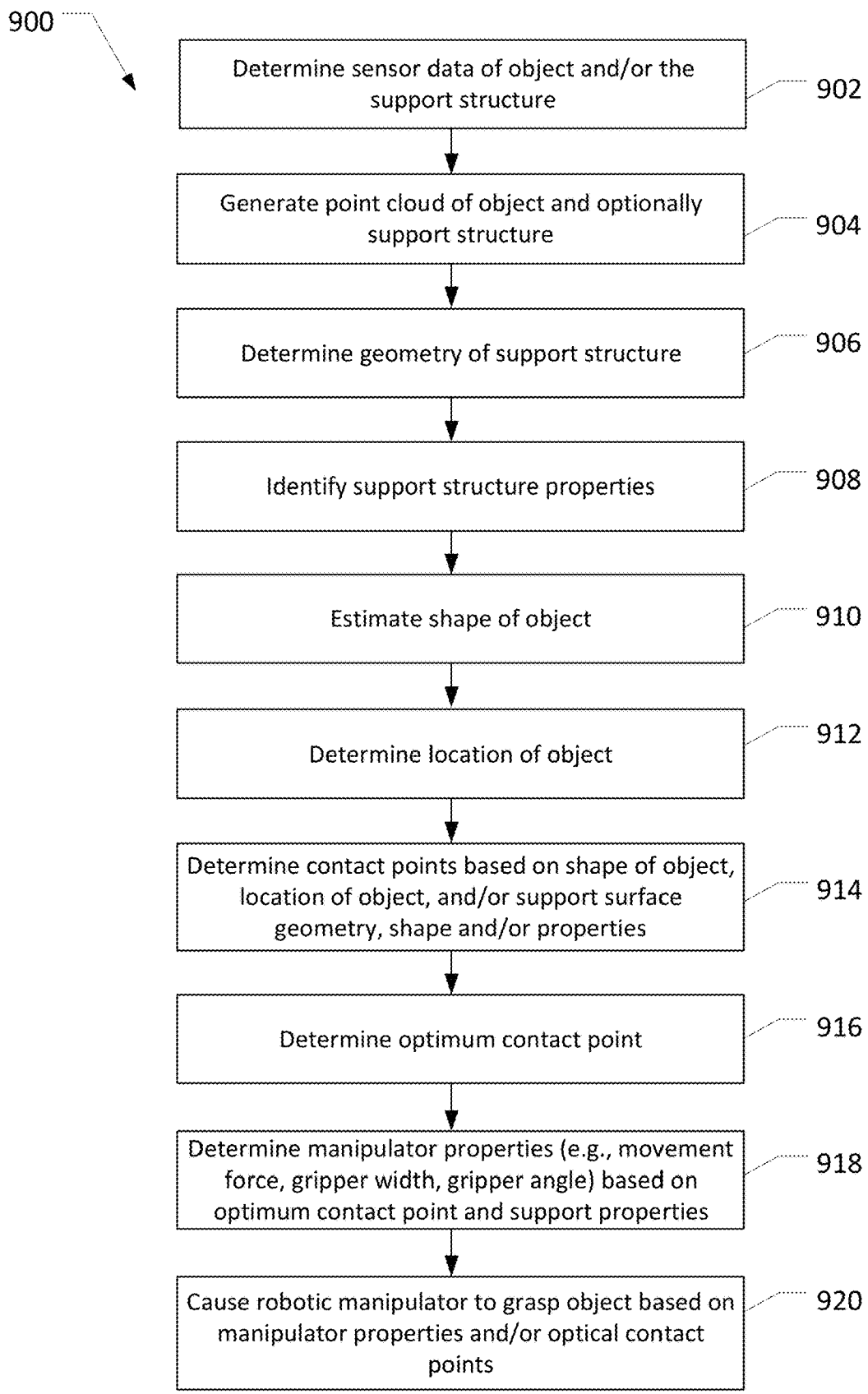
FIG. 9 is an exemplary process flow for determining how to grip an object on a deformable surface, in accordance with one or more example embodiments of the disclosure.

FIG. 9 depicts exemplary process flow 900 for determining how and where to grasp the object using the robotic manipulator, in accordance with one or more example embodiments of the disclosure. Some or all of the blocks of the process flows in this disclosure may be performed in a distributed manner across any number of devices (e.g., computing devices and/or servers). Some or all of the operations of the process flow may be optional and may be performed in a different order.

To employ process flow 900, at block 902 computer-executable instructions stored on a memory of a device, such as a controller and/or a computing device in communication with the controller, may be executed to determine sensor data of the object and/or the support structure. As explained above, sensor data may be RGB data, stereo data, greyscale data, depth data, and the like. At block 904, computer-executable instructions stored on a memory of a device, such as a controller and/or a computing device in communication with the controller, may be executed to generate a point cloud of the object and optionally the support structure (e.g., using the point cloud module).

At block 906, computer-executable instructions stored on a memory of a device, such as a controller and/or a computing device in communication with the controller, may be executed to determine the geometry of the support structure. For example, a side view of the support structure may be analyzed. Alternatively, or additionally, the support structure may be matched with a known model (e.g., a known 3-D model). At block 908, computer-executable instructions stored on a memory of a device, such as a controller and/or a computing device in communication with the controller, may be executed to determine support structure properties (e.g., compression value). This may either be known, input, or determined based on matching the support structure with a known support structure. In one example, the robotic manipulator may include one or more motion sensors (e.g., accelerometers) and motion data generated by the interaction between the robotic manipulator and the support structure may be used to determine and/or inform the structure properties (e.g., a compression value).

At block 910, computer-executable instructions stored on a memory of a device, such as a controller and/or a computing device in communication with the controller, may be executed to estimate the shape of the object. For example, the minimal volume bounding box (MVBB) technique may be used. At block 912, computer-executable instructions stored on a memory of a device, such as a controller and/or a computing device in communication with the controller, may be executed to determine a location of the object with respect to the robotic manipulator and/or the support surface. The point cloud or other sensor data may be analyzed to make this determination.

At block 914, computer-executable instructions stored on a memory of a device, such as a controller and/or a computing device in communication with the controller, may be executed to determine contact points on the object based on shape of object, location of object, and/or support surface geometry, shape and/or properties (e.g., compression value). At block 916, computer-executable instructions stored on a memory of a device, such as a controller and/or a computing device in communication with the controller, may be executed to determine an optimum contact point for grasping the object (e.g., the contact point that minimizes interference with the support structure and maximizes grip).

At block 918, computer-executable instructions stored on a memory of a device, such as a controller and/or a computing device in communication with the controller, may be executed to determine manipulator properties (e.g., movement force, gripper width, gripper angle) based on the optimum contact point and support structure properties. At block 920, computer-executable instructions stored on a memory of a device, such as a controller and/or a computing device in communication with the controller, may be executed to cause the robotic manipulator to grasp the object based on the properties determined block 918.

Illustrative Device Architecture

Figure 10:
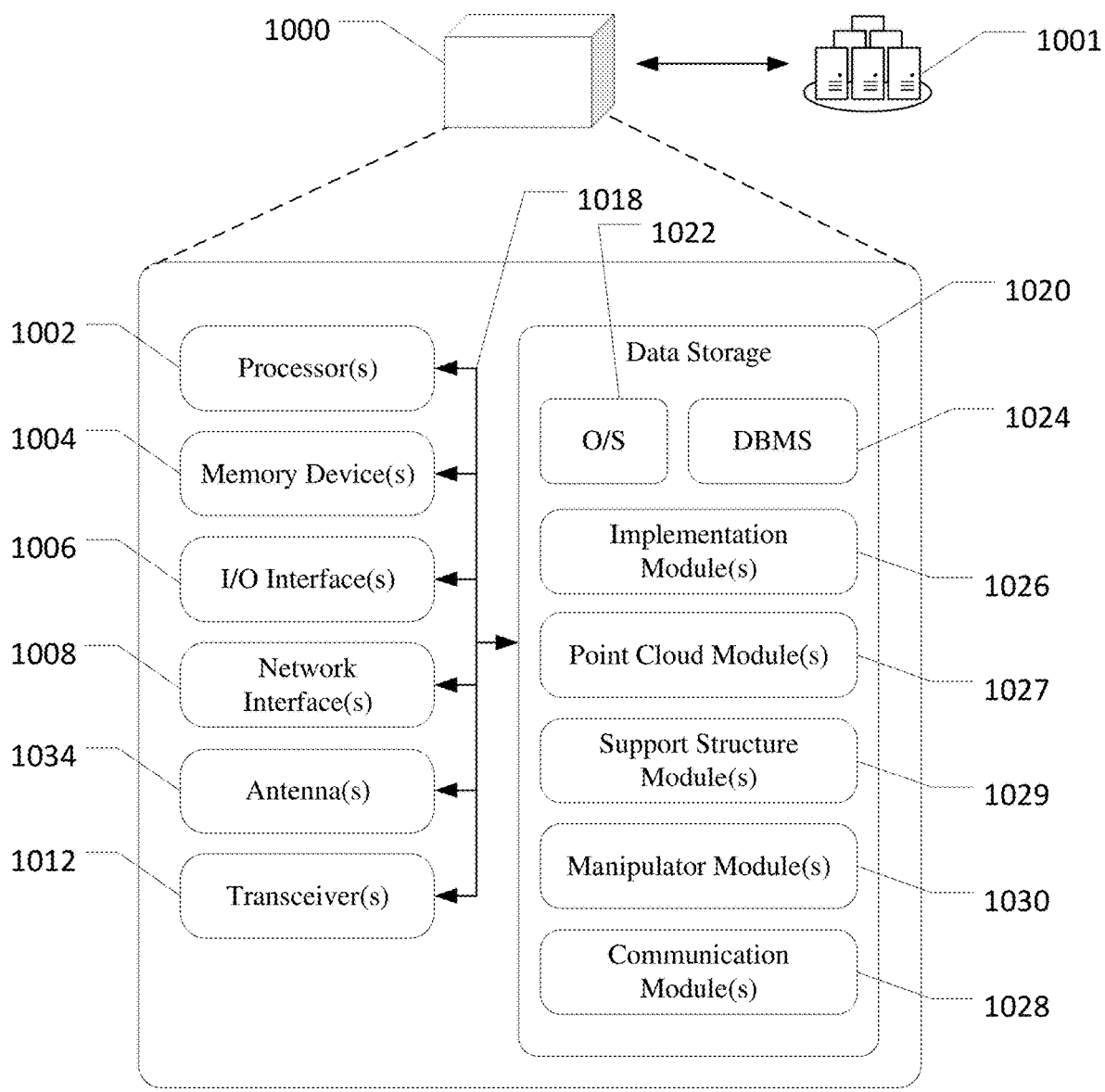
FIG. 10 is a schematic block diagram of a controller, in accordance with one or more example embodiments of the disclosure.

FIG. 10 is a schematic block diagram of a controller 1000 in accordance with one or more example embodiments of the disclosure. The controller 1000 may be a computing device in communication with a robotic manipulator, one or more sensor, and/or a computing device (e.g., computing device 1001). The computing device may be in communication with other computing devices (e.g., computing device 1001) which may optionally perform one or more of the tasks described herein together with the computing device. Controller 1000 may correspond to controller 104 of FIG. 1 and/or any other controller of FIGS. 1-9.

The controller 1000 may be configured to communicate via one or more networks with one or more computing devices, servers, electronic devices, user devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the controller 1000 may include one or more processors (processor(s)) 1002, one or more memory devices 1004 (generically referred to herein as memory 1004), one or more of the optional input/output (I/O) interface(s) 1006, one or more network interface(s) 1008, one or more transceivers 1012, and one or more antenna(s) 1034. The controller 1000 may further include one or more buses 1018 that functionally couple various components of the controller 1000. The controller 1000 may further include one or more antenna(e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 1000 MHz antenna, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the controller 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the controller 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more optional database management systems (DBMS) 1024; and one or more program module(s), applications, engines, computer-executable code, scripts, or the like such as, for example, one or more implementation module(s) 1026, one or more point cloud module(s) 1027, one or more communication module(s) 1028, one or more support structure module(s) 1029, and/or one or more manipulator module(s) 1030. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the controller 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 924 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1002 may be configured to access the memory 1004 and execute computer-executable instructions loaded therein. For example, the processor(s) 1002 may be configured to execute computer-executable instructions of the various program module(s), applications, engines, or the like of the controller 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 11, the implementation module(s) 1026 may include computer-executable instructions, code, or the like that are responsive to execution by one or more of the processor(s) 1002 may perform functions including, but not limited to, overseeing coordination and interaction between one or more modules and computer executable instructions in data storage 1020 and/or determining user selected actions and tasks. Implementation module 1026 may further coordinate with communication module 1028 to send messages to and receive messages from a remote computing device.

The point cloud module(s) 1027 may include computer-executable instructions, code, or the like that are responsive to execution by one or more of the processor(s) 1002 may perform functions including, but not limited to, generating point cloud representations and performing segmentation. Point cloud representations may be generated from the sensor data. Point cloud module may determine point cloud representations using any well-known techniques for generating point clouds.

The communication module(s) 1028 may include computer-executable instructions, code, or the like that are responsive to execution by one or more of the processor(s) 902 may perform functions including, but not limited to, communicating with one or more computing devices, for example, via wired or wireless communication, communicating with computing devices, communicating with one or more servers (e.g., remote servers), communicating with remote datastores and/or databases, sending or receiving notifications or commands/directives, communicating with cache memory data, and the like.

The support structure module(s) 1029 may include computer-executable instructions, code, or the like that are responsive to execution by one or more of the processor(s) 902 may perform functions including, but not limited to, maintaining a database or library of known support structures, known support structure properties (e.g., compression values, geometries, patterns and/or internal composition), and/or may maintain various three-dimensional models of known support structures.

The manipulator module(s) 1030 may include computer-executable instructions, code, or the like that are responsive to execution by one or more of the processor(s) 1002 may perform functions including, but not limited to, cause a robotic manipulator to move in various directions, at various forces, and/or at various angles. Manipulator module 1030 may further control the gripper of a robotic manipulator to open a certain distance, to close with a certain force, and to otherwise move as described herein.

Referring now to other illustrative components depicted as being stored in the data storage 1020, the O/S 1022 may be loaded from the data storage 1020 into the memory 1004 and may provide an interface between other application software executing on the controller 1000 and hardware resources of the controller 1000. More specifically, the O/S 1022 may include a set of computer-executable instructions for managing hardware resources of the controller 1000 and for providing common services to other application programs (e.g., managing memory allocation among various application programs). In certain example embodiments, the O/S 1022 may control execution of the other program module(s) for content rendering. The O/S 1022 may include any operating system now known or which may be developed in the future including, but not limited to, any server operating system, any mainframe operating system, or any other proprietary or non-proprietary operating system.

The optional DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the controller 1000, the input/output (I/O) interface(s) 1006 may facilitate the receipt of input information by the controller 1000 from one or more I/O devices as well as the output of information from the controller 1000 to the one or more I/O devices. The I/O devices may include any of a variety of components such as various sensors for navigation as well as the light emitting assembly described herein. The I/O devices may also optionally include a display or display screen having a touch surface or touchscreen; an audio output device for producing sound, such as a speaker; an audio capture device, such as a microphone; an image and/or video capture device, such as a camera; and so forth. Any of these components may be integrated into controller 1000 or may be separate.

The optional I/O interface(s) 906 may also include an interface for an external peripheral device connection such as universal serial bus (USB), FireWire, Thunderbolt, Ethernet port or other connection protocol that may connect to one or more networks. The optional I/O interface(s) 906 may also include a connection to one or more of the antenna(e) 934 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The controller 1000 may further include one or more network interface(s) 1008 via which the controller 1000 may communicate with any of a variety of other systems, platforms, networks, devices, and so forth. The network interface(s) 1008 may enable communication, for example, with one or more servers, computing devices, one or more wireless routers, one or more host servers, one or more web servers, and the like via one or more of networks. The transceiver(s) 1012 may have the same or substantially the same features, operation, and/or functionality as described above with respect to transceiver(s) 912.

It should be appreciated that the program module(s), applications, computer-executable instructions, code, or the like depicted in FIG. 10 as being stored in the data storage 1020, are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the controller 1000 and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the controller 1000 may include alternate and/or additional hardware, software, or firmware components beyond those described or depicted without departing from the scope of the disclosure. More particularly, it should be appreciated that software, firmware, or hardware components depicted as forming part of the controller 1000 are merely illustrative and that some components may not be present or additional components may be provided in various embodiments. While various illustrative program module(s) have been depicted and described as software module(s) stored in data storage 1020 and/or data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
   a support structure for supporting an object, the support structure having a compressible surface with a plurality of peaks and a plurality of troughs that are uniformly distributed about the compressible surface of the support structure;
   a sensor oriented towards the support structure and configured to generate image data;
   a robotic manipulator configured to grasp the object and having first dimensions; and
   a controller configured to:
      determine first image data using a color sensor, the first image data indicative of the support structure and the object;

determine, based on the first image data, a support type corresponding to the support structure, the support type associated with a compression value and a surface geometry;

determine, based on the first image data, a first location of the object with respect to the support structure and the robotic manipulator;

determine, based on the first image data and the first dimensions, a second location on the object for grasping the object;

determine a force and an angle for the robotic manipulator to grasp the object at the second location on the object based on the first location of the object, the second location on the object, the compression value, and the surface geometry; and cause the robotic manipulator to grasp the object at the second location on the object using the force and the angle.

2. The system of claim 1, wherein the controller is further configured to:

determine a point cloud representation of the object and the support structure based on the first image data; and determine the first location of the object with respect to the support structure and the robotic manipulator based on the point cloud representation.

3. The system of claim 2, wherein the controller is further configured to:

determine the support type based on the point cloud representation; and determine a three-dimensional model corresponding to the support type, the three-dimensional model incorporating the compression value and a support geometry.

4. The system of claim 1, wherein the support structure includes two or more layers and each of the two or more layers have a compression value that is different from other layers of the two or more layers.

5. A system comprising:

a support structure for supporting an object, the support structure having a compressible surface that is non-planar;

a sensor oriented towards the support structure;

a robotic manipulator configured to grasp the object; and a controller configured to:

determine sensor data from the sensor indicative of the support structure and the object;

determine a property of the support structure based on the sensor data;

determine a first location on the object for grasping the object based on the sensor data;

determine a force and an angle for the robotic manipulator to grasp the object based on the first location on the object and the property of the support structure; and cause the robotic manipulator to grasp the object at the first location on the object using the force and the angle, wherein the property of the support structure corresponds to a compression value of the support structure.

6. The system of claim 5, wherein the controller is further configured to:

determine a point cloud representation of the object and the support structure; and determine a location of the object with respect to the support structure and the robotic manipulator based on the point cloud representation.

7. The system of claim 6, wherein the controller is further configured to:

determine an estimated shape of the object based on the point cloud representation, wherein the first location on the object is based on the estimated shape of the object.

8. The system of claim 5, wherein the controller is further configured to:

determine a support type corresponding to the support structure and based on the sensor data; and determine a three-dimensional model corresponding to the support type.

9. The system of claim 5, wherein the controller is further configured to:

determine a support type corresponding to the support structure and based on the sensor data.

10. The system of claim 5, wherein the support structure includes two or more layers and each layer of the two or more layers has a compression value that is different from each other layer of the two or more layers.

11. The system of claim 5, wherein:

the support structure includes a plurality of peaks and a plurality of troughs that are uniformly distributed about the support structure, and the controller is further configured to align the robotic manipulator with one trough of the plurality of toughs.

12. The system of claim 5, wherein the controller is further configured to:

determine a geometry of the compressible surface of the support structure based on the sensor data; and determine the angle based on the geometry of the compressible surface of the support structure.

13. The system of claim 12, wherein the support structure has a longitudinal plane and the angle is defined by a normal plane that is normal to the longitudinal plane of the support structure.

14. The system of claim 12, wherein the controller is further configured to:

determine a void defined by the support structure and the object; and align a gripper of the robotic manipulator with the void.

15. A method comprising:

determining sensor data from a sensor, the sensor data indicative of a support structure and an object positioned on the support structure, the support structure having a compressible surface that is non-planar;

determining a property of the support structure based on the sensor data;

determining a first location of the object with respect to the support structure and a robotic manipulator based on the sensor data, the robotic manipulator having first dimensions;

determining a second location on the object for grasping the object using the robotic manipulator based on the sensor data and the first dimensions;

determining a force and an angle for the robotic manipulator to grasp the object based on the first location of the object, the second location on the object, and the property of the support structure; and causing, after determining the first location of the object and the second location on the object, the robotic manipulator to grasp the object at the second location on the object using the force and the angle wherein the property of the support structure corresponds to a compression value of the support structure.

16. The method of claim 15, further comprising:
determining a point cloud representation of the object and the support structure; and
determining the first location of the object with respect to the support structure and the robotic manipulator based on the point cloud representation.

17. The method of claim 16, further comprising:
determining an estimated shape of the object based on the point cloud representation, wherein the second location on the object is based on the estimated shape of the object.

18. The method of claim 15, further comprising:
determining a support type corresponding to the support structure and based on the sensor data; and
determining a three-dimensional model corresponding to the support type.

19. The method of claim 15, wherein the support structure includes two or more layers and each layer of the two or more layers has a layer compression value that is different from each other layer of the two or more layers.

20. The method of claim 15, further comprising:
determining a geometry of the surface of the support structure based on the sensor data; and
determining the angle based on the geometry of the surface of the support structure.

* * * * *